United States Patent [19]
Kasashima et al.

[11] Patent Number: 6,063,524
[45] Date of Patent: May 16, 2000

[54] HYDROGEN ABSORBING ALLOY FOR A NEGATIVE ELECTRODE OF AN ALKALINE STORAGE BATTERY

[75] Inventors: Masaki Kasashima; Noriaki Hamaya; Naofumi Shinya; Satoshi Shima, all of Fukui-ken, Japan

[73] Assignee: Shin-Etsu Chemical Co., Ltd., Tokyo, Japan

[21] Appl. No.: 09/009,502

[22] Filed: Jan. 20, 1998

[30] Foreign Application Priority Data

Nov. 6, 1997 [JP] Japan ..................... 9-304741

[51] Int. Cl.[7] ............... H01M 4/38; H01M 4/52; H01M 10/30

[52] U.S. Cl. ............... 429/218.2; 429/223; 429/231.6

[58] Field of Search ............... 420/900; 429/54, 429/206, 223, 218.2

[56] References Cited

FOREIGN PATENT DOCUMENTS

| | | |
|---|---|---|
| 51-13934 | 3/1976 | Japan . |
| 53-48918 | 5/1978 | Japan . |
| 54-64014 | 5/1979 | Japan . |
| 60-250558 | 12/1985 | Japan . |
| 61-233968 | 10/1986 | Japan . |
| 62-43064 | 2/1987 | Japan . |

*Primary Examiner*—Maria Nuzzolillo
*Assistant Examiner*—Mark Ruthkosky
*Attorney, Agent, or Firm*—Burns, Doane, Swecker & Mathis, L.L.P.

[57] ABSTRACT

The object is to provide a hydrogen absorbing alloy suitable for the negative electrode of a Ni-hydrogen storage battery which is effective at low temperatures. The object can be attained by a $LaNi_5$ type hydrogen absorbing alloy, wherein the content of Mg in the hydrogen absorbing alloy is 50 to 500 ppm, and it is represented by a general formula $RNi_aCo_bAl_cM_d$, wherein R comprises not less than 77 wt % La and 23 wt % or less of one or more metals other than La, Ni, Co, Al and M, M comprises at least one kind of metals selected from the group consisting of Fe, Cr, Cu and Mn, and a to d denote a positive number within a predetermined range. In addition, it is important to contain a small amount of Ti, Pb, oxygen, carbon and/or sulfur in said alloy.

20 Claims, No Drawings it has been improved one after another. Although the LaNi$_5$

HYDROGEN ABSORBING ALLOY FOR A NEGATIVE ELECTRODE OF AN ALKALINE STORAGE BATTERY

This application claims priority under 35 U.S.C. §§ 119 and/or 365 to 304741\1997 filed in Japan on Nov. 6, 1997; the entire content of which is hereby incorporated by reference.

BACKGROUND OF THE INVENTION

1. Field of the invention

The present invention relates to a hydrogen absorbing alloy, and more specifically, relates to a hydrogen absorbing alloy suitable as a negative electrode of an alkaline storage battery.

2. Description of the related art

Since a hydrogen absorbing alloy which charges and discharges hydrogen was discovered, the application thereof has been developed not only as hydrogen storage means but also for heat pumps and batteries. Furthermore, with the development of the electronic technology, down-sizing and labor saving of electronics have become an important factor. In addition, storage batteries using the hydrogen absorbing alloy have been recently used in highlands and cold areas, and batteries having an excellent low temperature property have been desired.

In particular, an alkaline storage battery which uses the hydrogen absorbing alloy as a negative electrode has been made practicable, and the hydrogen absorbing alloy used for it has been improved one after another. Although the LaNi$_5$ alloy (reference to Japanese Provisional Patent Publication No. 51-13934) has an advantage that the amount of hydrogen absorbed is large, it is easily cracked due to repetition of charge and discharge of hydrogen. Hence, it has such a disadvantage that the specific surface area of the alloy increases. As a deteriorated area increases, it is easily corroded by the alkaline solution.

The disadvantage has been improved by substituting a part of La of the LaNi$_5$ alloy with rare-earth metal elements such as Ce, Pr, Nd or the like, and/or substituting a part of Ni of the LaNi$_5$ alloy by metal such as Co, Al, Mn or the like (for example, Japanese Provisional Patent Publication Nos. 53-48918, 54-64014, 60-250558, 61-233968, and 62-43064).

And, as an alloy in which a part of La is substituted by Ce or the like, there are used a misch metal (Mm) containing 40 to 50 wt % ('wt %' is short for '% by weight') Ce and a La-rich misch metal (Lm) containing 50 to 60 wt % La and 10 to 30 wt % Ce.

In general, when a LaNi$_5$ type hydrogen absorbing alloy is used for batteries, it is essential that it has a high capacity, an excellent discharge property at low temperatures, and a long cycle life for repetition of charge and discharge.

In the above view, it was tried to attain the object by substituting a part of La by Ce. The cycle life for repetition of charge and discharge has been improved. However, the high rate discharge property, which is performed at a large current discharge, and discharge property at low temperatures have not been improved. Furthermore, it is found that by substituting Ni by Co, Mn, Al or the like, the high rate discharge property and the cycle life at an ordinary temperature are improved.

SUMMARY OF THE INVENTION

Therefore, it is the object of the present invention to provide a hydrogen absorbing alloy suitable for the negative electrode of a Ni-hydrogen storage battery having an effect at low temperatures.

In the above view, the present inventors have studied the synergism of the La site and the Ni site, and consequently, found that a hydrogen absorbing alloy for the negative electrode of alkaline storage batteries having a high capacity, a long cycle life and a discharging property at low temperatures (i.e. less than 0° C., specifically −30° C. to 0° C.), could be obtained by keeping La of the La site in a certain amount or more, and adding a small amount of Mg, a small amount of a metal element such as Ti or Pb, and adding a non-metal element such as carbon, oxygen or sulfur, and completed the present invention.

The present invention has been attained by a LaNi$_5$ type hydrogen absorbing alloy, wherein the content of Mg in the hydrogen absorbing alloy is 50 to 500 ppm, and the alloy is represented by a general formula RNi$_a$Co$_b$Al$_c$M$_d$. The R comprises not less than 77 wt % La and not more than 23 wt % of at least one metal other than La, Ni, Co, Al, M and Mg. The M comprises at least one metal selected from the group consisting of Fe, Cr, Cu and Mn. The a to d denote a molar ratio against R (R is designated as 1) representing a positive number within a range described below;

$$3.0 \leq a \leq 4.5;\ 0.3 \leq b \leq 1.0;\ 0 < c \leq 0.6;\ 0 < d \leq 0.5$$

In an embodiment of the present invention, the R may comprise 77 wt % or more La and 23 wt % or less of at least one rare-earth metal other than La.

In a further embodiment of the present invention, the hydrogen absorbing alloy may further comprise 0.05 wt % or less Ti and/or 0.05 wt % or less Pb.

In an embodiment of the present invention, the hydrogen absorbing alloy may further comprise at least one element selected from the group consisting of 0.3 wt % or less oxygen, 0.05 wt % or less carbon, and 0.05 wt % or less sulfur, which is a non-metal element in addition to Ti and/or Pb.

The hydrogen absorbing alloy of the present invention is suitable as the negative electrode of an alkaline secondary battery which has a large capacity and a long cycle life, and is excellent in the high-rate discharging property and the discharging property at low temperatures due to the effect of adding a small amount of elements such as Mg.

DETAILED DESCRIPTION OF PREFERRED EMBODIMENTS

When the LaNi$_5$ type hydrogen absorbing alloy of the present invention is used for the alkaline secondary battery, the improvement of the cycle life is obtained, while maintaining the high capacity at low temperatures. That is consequence of an increased content of the La component on the La site of the LaNi$_5$ type hydrogen absorbing alloy and addition of a small amount of Mg.

Furthermore, since the dissociation equilibrium pressure can be adjusted in a range favorable to the alkaline secondary battery by increasing the amount of La on the La site, the substituted amount of Mn or Al or the like on the Ni site can be made smaller than usual. Hence, the hydrogen absorbing alloy of the present invention is suitable for the negative electrode of an alkaline secondary battery having a high capacity and a long cycle life.

According to the present invention, the La site is represented by a general formula R. The R may comprise 77 wt % or more La. The R may preferably comprise 77 to 95 wt % La and 5 to 23 wt % of at least one rare-earth metal other than La. If the La content in the R is less than 77 wt %, the effect at low temperatures for the battery expected in the present invention may not be obtained. Furthermore, if the content of La in the R exceeds 95 wt %, a cycle life may be shortened. In the present invention, R may particularly preferably comprise 77 to 90 wt % La.

The rare-earth metal other than La, comprised by the R, may be one or more metals selected from the group consisting of Pr, Ce, Nd, Sm, Eu, Gd, Tb, Dy, Ho, Er, Tm, Yb, Lu and Y, which are contained in an amount of 23 wt % or less, preferably in an amount of from 5 to 23 wt %. The R may preferably comprise at least one rare-earth metal selected from the group consisting of Pr, Ce and Nd in an amount of 5 to 23 wt % in the R. Among them, Pr or Ce may be preferably comprised in an amount of 10 to 23 wt % in the R.

Furthermore, when La and at least one rare-earth metal selected from the group consisting of Pr, Ce and Nd may be used for the R, it is preferable that the total amount of them is 95 to 100 wt % in the R, and the remainder (0 to 5 wt %) is at least one other rare-earth metal. According to the present invention, it may be preferable that the R comprises two components of La and Ce, of La and Pr, or of La and Nd, and additionally comprises one or two different rare-earth metals when R has three or four components.

In the general formula $RNi_aCo_bAl_cM_d$ of the present invention, the amount of Ni is such that "a" may be in the range of 3.0 to 4.5 mole for the amount of Ni, when the amount of the R is designated as 1 mole. If the amount of Ni is smaller than a value in the range, the capacity is decreased, and if the amount of Ni is higher than a value in the range, the cycle life may be undesirably decreased.

The "b", "c" and "d" are also expressed, hereinafter, in the molar number when the amount of R is one mole, that is, molar ratio against the amount of R.

Furthermore, Co or Al additions can improve the corrosion resistance of the hydrogen absorbing alloy, respectively.

The content of Co may be in the range of $0.3 \leq b \leq 1.0$, more preferably in the range of $0.4 \leq b \leq 0.7$. If the content of Co is less than 0.3, the cycle life tends to be lowered. If it exceeds 1.0, it may not be preferable from the view point of the low temperature property and the high rate discharging property.

The content of Al may be in the range of $0 < c \leq 0.6$, more preferably in the range of $0.2 \leq c \leq 0.5$. If Al is not contained at all, the cycle life may be lowered. If the content of Al exceeds 0.6, the capacity may be undesirably decreased.

The M represents at least one metal selected from the group consisting of Fe, Mn, Cr and Cu.

The addition of M, for example, the addition of Mn has an effect to decrease the dissociation equilibrium pressure of hydrogen and increase the capacity of the battery. Since the addition thereof decreases the cycle life, however, the amount to be added may be in the range of $0 < d \leq 0.5$, and more preferably in the range of $0.05 \leq d \leq 0.3$. If M, particularly Mn, is not contained at all, the capacity of the battery may be decreased. If the amount of M exceeds 0.5, the cycle life of the battery may be undesirable decreased.

Furthermore, according to the present invention, in the composition on the Ni site, the sum of a, b, c and d, (a+b+c+d), may be preferably in the range of 4.5 to 5.5 so that the ability to absorb hydrogen or cycle life of the battery may further be increased.

With regard to the effect of the element contained in a small amount which is the characteristic of the present invention, Mg dissolves preferably in the alkaline solution at an initial stage and increases the surface area of said hydrogen absorbing alloy, when the alloy is assembled for the alkaline secondary battery. Hence, the low temperature property at an initial stage may be improved.

The added amount of Mg may be preferably in the range of 50 to 500 ppm, and more preferably in the range of 100 ppm to 400 ppm. If the added amount of Mg is less than 50 ppm, the discharging capacity of the battery may decrease and the improvement of the low temperature property of the battery may not be obtained. If the added amount of Mg exceeds 500 ppm, the cycle life may decrease.

The present invention is characterized in that the hydrogen absorbing alloy containing Mg in a small amount further contains Ti, Pb, C, O and/or S in a very small amount.

In the present invention, Ti is further contained in said alloy to form an intermetallic compound of Ti and Ni, Ti-Ni, which mainly exists in the grain boundary within the matrix, and easily becomes a starting point of a crack of said hydrogen absorbing alloy due to the expansion and shrinkage when hydrogen is charged and discharged. Hence, the low temperature property at the initial stage, particularly the electrical discharging property at low temperatures is improved. Furthermore, when carbon in a very small amount exists in the above alloy, a carbide of Ti, is formed, resulting in a excellent low temperature property as described below.

The added amount of Ti may be 0.05 wt % or less, preferably in the range of 0.005 to 0.05 wt %, more preferably in the range of 0.01 to 0.04 wt %. If the added amount of Ti is less than 0.005 wt %, the effect of the present invention may not be obtained. If the added amount of Ti exceeds 0.05 wt %, the cycle life of the battery may decrease.

Furthermore, Pb has an effect that when the above-mentioned alloy having Pb is assembled for the alkaline secondary battery, it elutes in the alkaline electrolytic solution, and increases the discharging voltage of the battery system, hence the discharging property at low temperatures is improved.

The added amount of Pb may be 0.05 wt % or less, preferably in the range of 0.001 to 0.05 wt %, and more preferably in the range of 0.005 to 0.04 wt %. If the added amount of Pb is less than 0.001 wt %, the effect of the present invention may not be obtained. If the added amount of Pb exceeds 0.05 wt %, the voltage at the time of charging may increase, thus it may not be preferable for the alkaline secondary battery.

Furthermore, the amount of oxygen added in said hydrogen absorbing alloy may be not more than 0.3 wt %, preferably from 0.01 to 0.3 wt %, and more preferably in the range of 0.03 to 0.2 wt %. If the added amount of oxygen is less than 0.01 wt %, the reactivity may become so strong that the handling may be difficult. If the added amount of oxygen exceeds 0.3 wt %, the oxide thin layer on the alloy surface may hinder the reaction on the alloy surface when the alloy is used for the alkaline secondary battery, hence the high-rate discharging property may be decreased.

Furthermore, the adjustment of oxygen content in said hydrogen absorbing alloy easily becomes possible by controlling the atmosphere during the production process.

Carbon, contained in a very small amount, bonds preferentially with a rare-earth metal element or Ti in said hydrogen absorbing alloy to form carbides, mainly exists in the grain boundary within the matrix, and easily becomes a starting point of a crack of said hydrogen absorbing alloy due to the expansion and shrinkage when hydrogen is charged and discharged. Hence, the low temperature property at the initial stage of the battery, particularly the high rate discharging property at the low temperatures, which is necessary for the recent portable equipment, is improved.

The amount of carbon added in said hydrogen absorbing alloy may be lower than 0.05 wt %, preferably in the range of 0.005 to 0.05 wt %, more preferably in the range of 0.01 to 0.04 wt %. If the added amount of carbon is less than 0.005 wt %, the carbides with Ti or a rare-earth metal may not be formed. If the added amount of carbon exceeds 0.05 wt %, the amount of the carbides with Ti or a rare-earth metal, present in the grain boundary, may be so large that the property of the battery may decrease.

The added amount of sulfur may be not more than 0.05 wt %, preferably in the range of 0.001 to 0.05 wt %, and more preferably in the range of 0.003 to 0.04 wt %. Sulfur easily forms sulfides with Ni or Co in said hydrogen absorbing alloy, and if the added amount of sulfur exceeds 0.05 wt %, the formed Ni- or Co-sulfides may be turned into the passivity to result in the decrease of the high-rate discharging property of the battery. If the added amount of sulfur is less than 0.001 wt %, when the alloy is assembled for the alkaline secondary battery, Ni and Co may elute in the alkaline electrolytic solution, and cause a decrease of the cycle life due to the decrease of the electrolytic solution.

In the present invention, the alloy may preferably contain not less than 77 wt % La and at least one rare-earth metal other than La on the La site, and Mg in an amount of 50 to 500 ppm, and further predetermined amounts of Ti and/or Pb for non-rare-earth metals, and predetermined amounts of O, C and/or S for non-metals.

Furthermore, the present invention provides an alloy having above-mentioned composition, but a metal element other than the above elements may be added to enhance the effect.

The hydrogen absorbing alloy of the present invention is produced in a manner that a predetermined amount of each element is weighed, and melted in vacuum (under low pressure of not higher than 0.01 Torr), or under a pressure of 200 to 800 Torr in an inert gas such as Ar, helium, neon etc., in a high-frequency melting furnace by using a crucible or the like to cast an ingot in an iron mold or the like at 1300 to 1600° C. Furthermore, the ingot is subjected to a heat treatment in vacuum (under low pressure of not higher than 0.01 Torr), or in an inert gas such as Ar, helium or neon (under the pressure 600 to 1000 Torr) at 800 to 1200° C. for 5 to 20 hours.

The hydrogen absorbing alloy prepared by the above-mentioned method is pulverized by an impact-type or an attrition-type pulverizer in an inert atmosphere such as Ar, helium, neon, nitrogen, etc., so that hydrogen absorbing alloy powder with the average particle diameter 5 to 50 μm is obtained.

The hydrogen absorbing alloy powder thus obtained is mixed by using a binder such as polyvinyl alcohol, cellulose such as methyl cellulose, carboxymethyl cellulose and the like, PTFE, polyethylene oxide, polymeric latex and the like to make a paste, and filled in a three-dimensional conductive substrate such as nickel foam, nickel fiber or the like, or in a two-dimensional conductive substrate such as punched metal or the like, to make an electrode. The amount of said binder to be used may be preferably in the range of 0.1 to 20 parts by weight per 100 parts by weight of the alloy.

The alkaline storage battery in which the hydrogen absorbing alloy of the present invention is used as the negative electrode has a large capacity, a long cycle life for repetition of charge and discharge, and excellent high-rate discharging property and discharging property at low temperatures.

The present invention will now be described in detail using Examples. However, the present invention is not limited to these examples.

EXAMPLES 1 TO 24

Comparative Examples 1 to 8

Each element of La (purity: not lower than 99 wt %), Ce (purity: not lower than 99 wt %), Pr (purity: not lower than 99 wt %), Nd (purity: not lower than 99 wt %), Ni (purity: not lower than 99 wt %), Co (purity: not lower than 99 wt %), Mn (purity: not lower than 99 wt %) and Al (purity: not lower than 99 wt %) were weighed and mixed so that mixing compositions shown in Table 1 and Table 2 were obtained. In addition, in Table 1 and Table 2, they were mixed so that when the sum total of the La site, that is, of R site (La, Ca, Pr and Nd) was designated as 1.0, the sum total of the Ni site (Ni, Co, Al and Mn) became 5.0. Furthermore, the column of "Added elements" in Table 1 and Table 2 shows ppm or wt % in the whole alloy.

Furthermore, the elements to be added such as Mg and the like were added thereto, heated and dissolved by a high-frequency dissolution (1400° C.), and further subjected to a heat treatment under 760 Torr in an Ar atmosphere at 900° C. for 5 hours to prepare hydrogen absorbing alloys having compositions shown in Table 1 and Table 2.

The obtained alloys were pulverized by an impact-type pulverizer so as to produce hydrogen absorbing alloy powder with the average particle diameter of 35 μm.

As for the oxygen amount, the oxygen content in an inert gas (Ar) was adjusted in each unit operation of the high-frequency melting, heat treatment and pulverization to obtain hydrogen absorbing alloys having a predetermined oxygen amount.

This alloy powder was mixed with an aqueous solution of 3 wt % polyvinyl alcohol (the average degree of polymerization: 2000, the degree of saponification: 98 mole %) at the ratio of 10 g powder to 2.5 g solution and resulted in paste. This paste was filled in a foaming porous body of nickel metal in an amount of 30% by volume and dried, and molded under pressure to prepare a plate having a thickness of 0.5 to 1.0 mm, and a lead was attached thereto to obtain the negative electrode.

A sintering type electrode was used for the positive electrode, and wrapped to the negative electrode through a PP (polypropylene) separator, and the wrapped electrodes were immersed in 6N KOH electrolytic solution to prepare a battery.

Discharge property of the obtained battery was measured according to Japanese Industrial standard C 8705.

The obtained battery was charged up to 120% with respect to the negative capacity at 0.1 C, and after a halt of 1 hour, discharged at 0.2 C until the battery voltage became 0.6 V. This cycle was repeated 5 times, then the high rate discharging property and the discharging property at low temperatures (1 C discharge at −10° C. and −18° C.) were measured. The high rate discharge property was measured at 3 C as shown in Tables 3 and 4. The discharge property shows the discharging amount to the negative electrode capacity and 1 C means discharge for 1 g of alloy metal for 1 hour at 300 mA/h, while 3 C means discharge for 1g of alloy metal at 900 mA/h.

In addition, this cycle life is a ratio of the capacity at the 200th cycles to the capacity at the 5th cycle. The result is shown in Table 3.

In Comparative Examples 1 to 8, the alloys were prepared as in Examples, and subjected to a battery test. The results are shown in Table 3 and Table 4.

It is obvious in Tables 3 and 4 that not only usual 0.2 C discharge (60 mA/h) but also high rate discharge property, which is performed at large current discharges of 1 C (300 mA/h) and 3 C (900 mA/h), are good according to the present invention.

TABLE 1

| Samples | Compositions Of Hydrogen Absorbing Alloy | | | | | | | | | | | | | |
|---|---|---|---|---|---|---|---|---|---|---|---|---|---|---|
| Example | R (wt %/R) | | | | Ni site (molar ratios) | | | | Additional Elements (Mg: ppm, others: wt %) | | | | | |
| No. | La | Ce | Pr | Nd | Ni | Co | Al | Mn | Mg | Ti | Pb | O | C | S |
| 1 | 78 | 5 | 14 | 3 | 3.7 | 0.65 | 0.45 | 0.2 | 300 | 0.03 | 0.02 | 0.1 | 0.02 | 0.01 |
| 2 | 80 | 7 | 10 | 3 | 3.7 | 0.65 | 0.45 | 0.2 | 300 | 0.03 | 0.02 | 0.1 | 0.02 | 0.01 |
| 3 | 85 | 5 | 7 | 3 | 3.7 | 0.65 | 0.45 | 0.2 | 300 | 0.03 | 0.02 | 0.1 | 0.02 | 0.01 |
| 4 | 90 | 10 | 0 | 0 | 3.7 | 0.65 | 0.45 | 0.2 | 300 | 0.03 | 0.02 | 0.1 | 0.02 | 0.01 |
| 5 | 80 | 20 | 0 | 0 | 3.7 | 0.65 | 0.45 | 0.2 | 300 | 0.03 | 0.02 | 0.1 | 0.02 | 0.01 |
| 6 | 80 | 0 | 20 | 0 | 3.7 | 0.65 | 0.45 | 0.2 | 300 | 0.03 | 0.02 | 0.1 | 0.02 | 0.01 |
| 7 | 80 | 0 | 0 | 20 | 3.7 | 0.65 | 0.45 | 0.2 | 300 | 0.03 | 0.02 | 0.1 | 0.02 | 0.01 |
| 8 | 80 | 20 | 0 | 0 | 3.7 | 0.65 | 0.45 | 0.2 | 300 | 0.01 | 0.02 | 0.1 | 0.01 | 0.01 |
| 9 | 80 | 0 | 20 | 0 | 3.7 | 0.65 | 0.45 | 0.2 | 300 | 0.04 | 0.02 | 0.1 | 0.04 | 0.01 |
| 10 | 80 | 0 | 0 | 20 | 3.7 | 0.65 | 0.45 | 0.2 | 300 | 0.03 | 0.03 | 0.1 | 0.02 | 0.01 |
| 11 | 78 | 5 | 15 | 3 | 3.8 | 0.55 | 0.45 | 0.2 | 300 | 0.03 | 0.005 | 0.1 | 0.02 | 0.01 |
| 12 | 80 | 7 | 10 | 3 | 3.8 | 0.55 | 0.45 | 0.2 | 300 | 0.03 | 0.02 | 0.03 | 0.02 | 0.01 |
| 13 | 85 | 5 | 7 | 3 | 3.8 | 0.55 | 0.45 | 0.2 | 300 | 0.03 | 0.02 | 0.2 | 0.02 | 0.01 |
| 14 | 90 | 10 | 0 | 0 | 3.8 | 0.55 | 0.45 | 0.2 | 300 | 0.03 | 0.02 | 0.1 | 0.02 | 0.003 |
| 15 | 90 | 10 | 0 | 0 | 3.8 | 0.55 | 0.45 | 0.2 | 300 | 0.03 | 0.02 | 0.1 | 0.02 | 0.04 |
| 16 | 78 | 5 | 14 | 3 | 3.7 | 0.65 | 0.45 | 0.2 | 60 | 0.03 | 0.02 | 0.1 | 0.02 | 0.01 |
| 17 | 78 | 5 | 14 | 3 | 3.7 | 0.65 | 0.45 | 0.2 | 100 | 0.03 | 0.02 | 0.1 | 0.02 | 0.01 |
| 18 | 78 | 5 | 14 | 3 | 3.7 | 0.65 | 0.45 | 0.2 | 400 | 0.03 | 0.02 | 0.1 | 0.02 | 0.01 |
| 19 | 78 | 5 | 14 | 3 | 3.7 | 0.65 | 0.45 | 0.2 | 300 | 0.003 | 0.02 | 0.1 | 0.0008 | 0.01 |
| 20 | 78 | 5 | 14 | 3 | 3.7 | 0.65 | 0.45 | 0.2 | 300 | 0.07 | 0.02 | 0.1 | 0.07 | 0.01 |
| 21 | 78 | 5 | 14 | 3 | 3.7 | 0.65 | 0.45 | 0.2 | 300 | 0.03 | 0.0008 | 0.1 | 0.02 | 0.01 |
| 22 | 78 | 5 | 14 | 3 | 3.7 | 0.65 | 0.45 | 0.2 | 300 | 0.03 | 0.07 | 0.1 | 0.02 | 0.01 |
| 23 | 78 | 5 | 14 | 3 | 3.7 | 0.65 | 0.45 | 0.2 | 300 | 0.03 | 0.02 | 0.008 | 0.02 | 0.0008 |
| 24 | 78 | 5 | 14 | 3 | 3.7 | 0.65 | 0.45 | 0.2 | 300 | 0.03 | 0.02 | 0.4 | 0.02 | 0.07 |

TABLE 2

| Samples | Compositions Of Hydrogen Absorbing Alloy | | | | | | | | | | | | | |
|---|---|---|---|---|---|---|---|---|---|---|---|---|---|---|
| Comparative | R (wt %/R) | | | | Ni site (molar ratios) | | | | Additional Elements (Mg: ppm, others: wt %) | | | | | |
| Example No. | La | Ce | Pr | Nd | Ni | Co | Al | Mn | Mg | Ti | Pb | O | C | S |
| 1 | 75 | 7 | 15 | 3 | 3.7 | 0.65 | 0.45 | 0.2 | 300 | 0.03 | 0.02 | 0.1 | 0.02 | 0.01 |
| 2 | 60 | 27 | 10 | 3 | 3.7 | 0.65 | 0.45 | 0.2 | 300 | 0.03 | 0.02 | 0.1 | 0.02 | 0.01 |
| 3 | 70 | 5 | 22 | 3 | 3.7 | 0.65 | 0.45 | 0.2 | 300 | 0.03 | 0.02 | 0.1 | 0.02 | 0.01 |
| 4 | 50 | 10 | 30 | 10 | 3.7 | 0.65 | 0.45 | 0.2 | 300 | 0.03 | 0.02 | 0.1 | 0.02 | 0.01 |
| 5 | 80 | 20 | 0 | 0 | 3.7 | 0.65 | 0.45 | 0.2 | 10 | 0.03 | 0.02 | 0.1 | 0.02 | 0.01 |
| 6 | 80 | 20 | 0 | 0 | 3.7 | 0.65 | 0.45 | 0.2 | 40 | 0.03 | 0.02 | 0.1 | 0.02 | 0.01 |
| 7 | 80 | 20 | 0 | 0 | 3.7 | 0.65 | 0.45 | 0.2 | 600 | 0.03 | 0.02 | 0.1 | 0.02 | 0.01 |
| 8 | 80 | 20 | 0 | 0 | 3.7 | 0.65 | 0.45 | 0.2 | 800 | 0.01 | 0.02 | 0.1 | 0.01 | 0.01 |

TABLE 3

| | Battery Test Result Examples | | | | | |
|---|---|---|---|---|---|---|
| Samples Example No. | high rate discharge property 20° C. 3 C discharge m Ah/g | discharge property at low temperature −10° C. 1 C discharge m Ah/g | discharge property at low temperature −18° C. 1 C discharge m Ah/g | capacity at 5th cycle 20° C. 0.2 C discharge m Ah/g | capacity at 200th cycle 20° C. 0.2 C discharge m Ah/g | cycle life (20° C., 0.2 C) ratios of capacity at 200th cycle to capacity at 5th cycle |
| 1 | 177 | 227 | 125 | 305 | 287 | 0.94 |
| 2 | 173 | 230 | 127 | 309 | 287 | 0.93 |
| 3 | 179 | 241 | 128 | 322 | 299 | 0.93 |
| 4 | 187 | 243 | 130 | 310 | 282 | 0.91 |
| 5 | 176 | 225 | 120 | 337 | 320 | 0.95 |
| 6 | 177 | 227 | 127 | 310 | 288 | 0.93 |
| 7 | 172 | 222 | 125 | 312 | 293 | 0.94 |
| 8 | 169 | 228 | 121 | 311 | 292 | 0.94 |
| 9 | 169 | 219 | 123 | 307 | 282 | 0.92 |

TABLE 3-continued

Battery Test Result Examples

| Samples Example No. | high rate discharge property 20° C. 3 C discharge m Ah/g | discharge property at low temperature −10° C. 1 C discharge m Ah/g | discharge property at low temperature −18° C. 1 C discharge m Ah/g | capacity at 5th cycle 20° C. 0.2 C discharge m Ah/g | capacity at 200th cycle 20° C. 0.2 C discharge m Ah/g | cycle life (20° C., 0.2 C) ratios of capacity at 200th cycle to capacity at 5th cycle |
|---|---|---|---|---|---|---|
| 10 | 167 | 205 | 130 | 309 | 287 | 0.93 |
| 11 | 176 | 225 | 117 | 307 | 286 | 0.93 |
| 12 | 175 | 202 | 134 | 304 | 280 | 0.92 |
| 13 | 181 | 221 | 137 | 308 | 286 | 0.93 |
| 14 | 192 | 211 | 136 | 331 | 308 | 0.93 |
| 15 | 196 | 220 | 135 | 334 | 304 | 0.91 |
| 16 | 172 | 220 | 121 | 303 | 285 | 0.94 |
| 17 | 174 | 223 | 127 | 301 | 283 | 0.94 |
| 18 | 178 | 221 | 128 | 303 | 282 | 0.93 |
| 19 | 171 | 201 | 117 | 305 | 281 | 0.92 |
| 20 | 177 | 202 | 127 | 299 | 278 | 0.93 |
| 21 | 171 | 203 | 115 | 300 | 279 | 0.93 |
| 22 | 172 | 208 | 120 | 303 | 282 | 0.93 |
| 23 | 169 | 202 | 121 | 304 | 280 | 0.92 |
| 24 | 172 | 201 | 113 | 297 | 270 | 0.91 |

TABLE 4

Battery Test Result Comparative Examples

| Samples Comparative Example No. | high rate discharge property 20° C. 3 C discharge m Ah/g | discharge property at low temperature −10° C. 1 C discharge m Ah/g | discharge property at low temperature −18° C. 1 C discharge m Ah/g | capacity at 5th cycle 20° C. 0.2 C discharge m Ah/g | capacity at 200th cycle 20° C. 0.2 C discharge m Ah/g | cycle life (20° C., 0.2 C) ratios of capacity at 200th cycle to capacity at 5th cycle |
|---|---|---|---|---|---|---|
| 1 | 175 | 211 | 110 | 301 | 283 | 0.94 |
| 2 | 163 | 192 | 107 | 298 | 283 | 0.95 |
| 3 | 172 | 223 | 109 | 300 | 276 | 0.92 |
| 4 | 151 | 195 | 92 | 283 | 269 | 0.95 |
| 5 | 151 | 221 | 91 | 337 | 310 | 0.92 |
| 6 | 152 | 223 | 97 | 335 | 312 | 0.93 |
| 7 | 177 | 232 | 131 | 336 | 292 | 0.87 |
| 8 | 176 | 237 | 137 | 333 | 280 | 0.84 |

What is claimed is:

1. A hydrogen absorbing alloy for a negative electrode of an alkaline storage battery represented by a general formula $RNi_aCo_bAl_cM_d$ and containing 50 to 500 ppm of Mg, wherein R comprises 77 wt % or more La and 23 wt % or less of one or more metals other than La, Ni, Co, Al, M and Mg; M comprises at least one metal selected from the group consisting of Fe, Cr, Cu and Mn; and each of a to d denotes a positive number representing a molar ratio to R, and $3.0 \leq a \leq 4.5$; $0.3 \leq b \leq 1.0$; $0 < c \leq 0.6$; $0 < d \leq 0.5$.

2. A hydrogen absorbing alloy for a negative electrode of an alkaline storage battery according to claim 1 wherein said R comprises 77 wt % or more La and 23 wt % or less of one or more of rare-earth metals other than La.

3. A hydrogen absorbing alloy for a negative electrode of an alkaline storage battery according to claim 2, further comprising 0.05 wt % or less Ti, and/or 0.05 wt % or less Pb.

4. A hydrogen absorbing alloy for a negative electrode of an alkaline storage battery according to claim 3, further comprising at least one selected from the group consisting of 0.3 wt % or less oxygen, 0.05 wt % or less carbon, and 0.05 wt % or less sulfur.

5. A hydrogen absorbing alloy for a negative electrode of an alkaline storage battery according to claim 2 wherein said R comprises 77 wt % or more La and 23 wt % or less of one or more rare-earth metals selected from the group consisting of Ce, Pr and Nd.

6. A hydrogen absorbing alloy for a negative electrode of an alkaline storage battery according to claim 2 wherein said R comprises 77 wt % or more La and 23 wt % or less Ce.

7. A hydrogen absorbing alloy for a negative electrode of an alkaline storage battery according to claim 2 wherein said R comprises 77 wt % or more La and 23 wt % or less Pr.

8. A hydrogen absorbing alloy for a negative electrode of an alkaline storage battery according to claim 2 wherein said R comprises 77 wt % or more of La and 23 wt % or less Nd.

9. A hydrogen absorbing alloy for a negative electrode of an alkaline storage battery according to claim 2 wherein said R comprises 77 to 95 wt % La.

10. A hydrogen absorbing alloy for a negative electrode of an alkaline storage battery according to claim 2 wherein the amount of said Mg is 100 to 400 ppm.

11. A hydrogen absorbing alloy for a negative electrode of an alkaline storage battery according to claim 2, further comprising 0.005 to 0.05 wt % Ti, and 0.001 to 0.05 wt % Pb.

12. A hydrogen absorbing alloy for a negative electrode of an alkaline storage battery according to claim 3, further comprising 0.01 to 0.3 wt % oxygen, 0.005 to 0.05 wt % carbon, and 0.001 to 0.05 wt % sulfur.

13. A negative electrode of an alkaline storage battery using said hydrogen absorbing alloy for a negative electrode of an alkaline storage battery according to claim 1.

14. A negative electrode of an alkaline storage battery using said hydrogen absorbing alloy for a negative electrode of an alkaline storage battery according to claim 2.

15. A negative electrode of an alkaline storage battery using said hydrogen absorbing alloy for a negative electrode of an alkaline storage battery according to claim 3.

16. A negative electrode of an alkaline storage battery using said hydrogen absorbing alloy for a negative electrode of an alkaline storage battery according to claim 4.

17. A hydrogen absorbing alloy for a negative electrode of an alkaline storage battery according to claim 1, further comprising 0.005 to 0.05 wt % Ti, 0.001 to 0.05 wt % Pb, 0.01 to 0.3 wt % oxygen, 0.005 to 0.05 wt % C and 0.001 to 0.05 wt % S.

18. A hydrogen absorbing alloy for a negative electrode of an alkaline storage battery according to claim 1, wherein a+b+c+d=4.5 to 5.5.

19. A hydrogen absorbing alloy for a negative electrode of an alkaline storage battery according to claim 1, further comprising an intermetallic compound of TiN in grain boundaries of said hydrogen storage alloy.

20. A hydrogen absorbing alloy for a negative electrode of an alkaline storage battery according to claim 1, wherein M consists essentially of Mn, c is 0.2 to 0.5 and d is 0.5 to 0.3.

* * * * *